United States Patent
Eastwick et al.

(10) Patent No.: US 8,240,434 B2
(45) Date of Patent: Aug. 14, 2012

(54) FLOW CONTROL ARRANGEMENT

(75) Inventors: Carol Norma Eastwick, Nottingham (GB); Kathryn Anne Simmons, Derby (GB); Graham Johnson, Nottingham (GB); Stephen John Pickering, Nottingham (GB); Mark Farrall, London (GB)

(73) Assignee: Rolls-Royce PLC, London (GB)

( * ) Notice: Subject to any disclaimer, the term of this patent is extended or adjusted under 35 U.S.C. 154(b) by 807 days.

(21) Appl. No.: 11/826,289

(22) Filed: Jul. 13, 2007

(65) Prior Publication Data
US 2008/0029167 A1     Feb. 7, 2008

(30) Foreign Application Priority Data
Aug. 2, 2006  (GB) .................................. 0615298.7

(51) Int. Cl.
*F01M 1/00*         (2006.01)
(52) U.S. Cl. ............. 184/13.1; 184/6.26; 184/11.1; 184/11.3; 184/107; 384/465; 384/466; 384/473; 384/478
(58) Field of Classification Search ................ 184/13.1; 277/402, 408; 384/478, 465, 472, 473
See application file for complete search history.

(56) References Cited

U.S. PATENT DOCUMENTS

| | | | | |
|---|---|---|---|---|
| 1,886,966 A * | 11/1932 | Meyer | ............ | 384/548 |
| 2,827,344 A * | 3/1958 | Maag | ............ | 384/484 |
| 2,992,842 A * | 7/1961 | Shevchenko et al. | ......... | 277/306 |
| 2,998,287 A * | 8/1961 | Pritchett | ............ | 384/466 |
| 3,243,243 A * | 3/1966 | Diver et al. | ............ | 384/465 |
| 4,463,956 A * | 8/1984 | Malott | ............ | 277/412 |
| 4,527,912 A * | 7/1985 | Klusman | ............ | 384/99 |
| 4,878,572 A * | 11/1989 | Gay et al. | ............ | 192/98 |
| 5,133,609 A * | 7/1992 | Ishiguro | ............ | 384/486 |
| 5,292,199 A * | 3/1994 | Hosbach et al. | ............ | 384/478 |
| 6,715,765 B2 * | 4/2004 | Machida | ............ | 277/409 |

FOREIGN PATENT DOCUMENTS

| | | |
|---|---|---|
| DE | 3115193 A1 * | 11/1982 |
| JP | 10176720 A * | 6/1998 |
| JP | A 10-176720 | 6/1998 |

* cited by examiner

*Primary Examiner* — Robert A Siconolfi
*Assistant Examiner* — San Aung
(74) *Attorney, Agent, or Firm* — Oliff & Berridge, PLC

(57) ABSTRACT flow control arrangement for controlling the flow of lubricant discharged from a bearing includes a flow control member locatable, in use, adjacent to the bearing. The flow control member defines a generally radially outer edge and is rotatable to direct lubricant discharged onto the flow control member radially outwardly towards the outer edge for ejection therefrom.

17 Claims, 2 Drawing Sheets

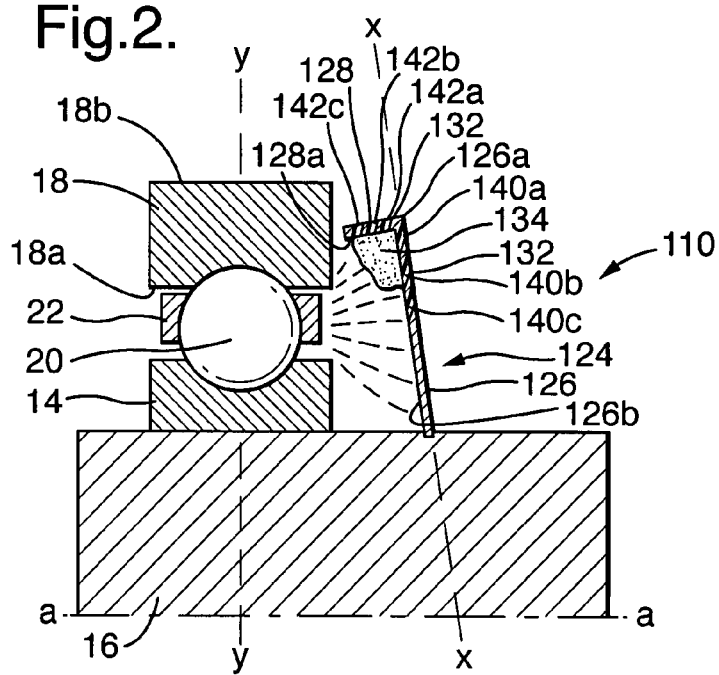
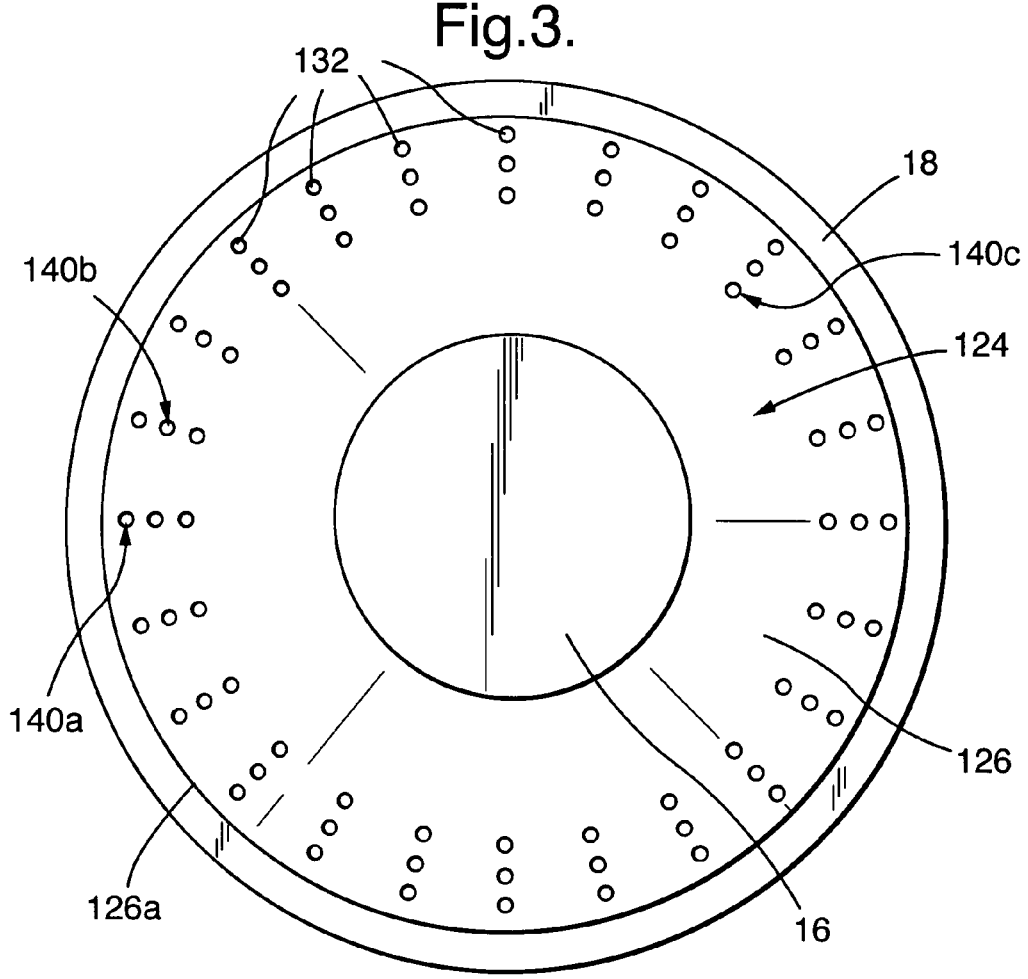

FLOW CONTROL ARRANGEMENT

The present invention relates to a flow control arrangement for controlling the flow of lubricant discharged from a bearing.

The way in which lubricant, particularly oil, is discharged from un-shrouded bearings is currently unpredictable, and the amount of lubricant that must be supplied to the bearing to achieve adequate lubrication and cooling can therefore be difficult to predict and control. Unpredictable discharge can also be disadvantageous in the case of un-shrouded bearings used in gas turbine engines since it can be difficult to make effective use of the lubricant discharged from the bearing.

A bearing assembly including a static oil permeable element has been proposed in EP 1496209. Whilst the static oil permeable element collects oil discharged from the bearing to prevent it entering the main body of the bearing chamber, it does not control the flow of oil that is discharged from the bearing.

According to a first aspect of the present invention, there is provided a flow control arrangement for controlling the flow of lubricant discharged from a bearing, the flow control arrangement including a flow control member disposed adjacent to the bearing, the flow control member defining a generally radially outer edge and being rotatable to direct lubricant discharged onto the flow control member radially outwardly towards the outer edge for ejection therefrom.

The flow control member may be locatable in use at a position axially spaced from the bearing.

The flow control member may include an orifice which may permit the ejection of lubricant therefrom, possibly from the radially outer edge. The orifice may be arranged to permit the ejection of lubricant in a predetermined direction, possibly from the radially outer edge in a predetermined direction. The flow control member may include a plurality of said orifices. The orifices may have a predetermined orientation and may be of any desired shape or size.

The flow control member may include a generally annular portion. The flow control member may include a lip portion which may extend from an outer edge of the annular portion. The lip portion may extend in a direction towards the bearing.

The annular portion may define an axis which may be substantially parallel in use to a bearing radial axis. Alternatively, the axis may be inclined relative to the bearing radial axis such that the annular portion is inclined in use towards the bearing.

The annular portion may include a plurality of said orifices and these may be spaced circumferentially around the annular portion, possibly adjacent to the outer edge thereof, to define a circumferential row of orifices. The annular portion may include a plurality of said circumferential rows of orifices. Said circumferential rows of orifices may be spaced radially across the annular portion, and possibly in proximity to the outer edge of the annular portion.

The lip portion may include a plurality of said orifices and these may be spaced circumferentially around the lip portion to define a circumferential row of orifices. The lip portion may include a plurality of said circumferential rows of orifices. Said circumferential rows of orifices may be spaced along the lip portion.

The flow control member may be arranged to be mounted in use on the shaft on which the bearing is mounted so that the flow control member is rotated by the shaft. Alternatively, the flow control member may be arranged to be mounted in use on an inner ring of the bearing so that the flow control member is rotated by the inner ring. As a further alternative, the flow control member may be arranged to be mounted in use on a cage of the bearing so that the flow control member is rotated by the cage.

According to a second aspect of the present invention, there is provided a bearing assembly including a bearing mountable in use on a shaft for rotation by the shaft and a flow control arrangement according to the first aspect of the present invention for controlling the flow of lubricant discharged from the bearing.

According to a third aspect of the present invention, there is provided a gas turbine engine including a flow control arrangement according to the first aspect of the present invention or a bearing assembly according to the second aspect of the present invention.

Embodiments of the present invention will now be described by way of example only and with reference to the accompanying drawings, in which:—

FIG. 2 is a diagrammatic cross-sectional view of part of a flow control arrangement according to a second embodiment of the present invention; and FIG. 3 is a diagrammatic side view of the flow control arrangement of FIG. 2.

Figure 1:
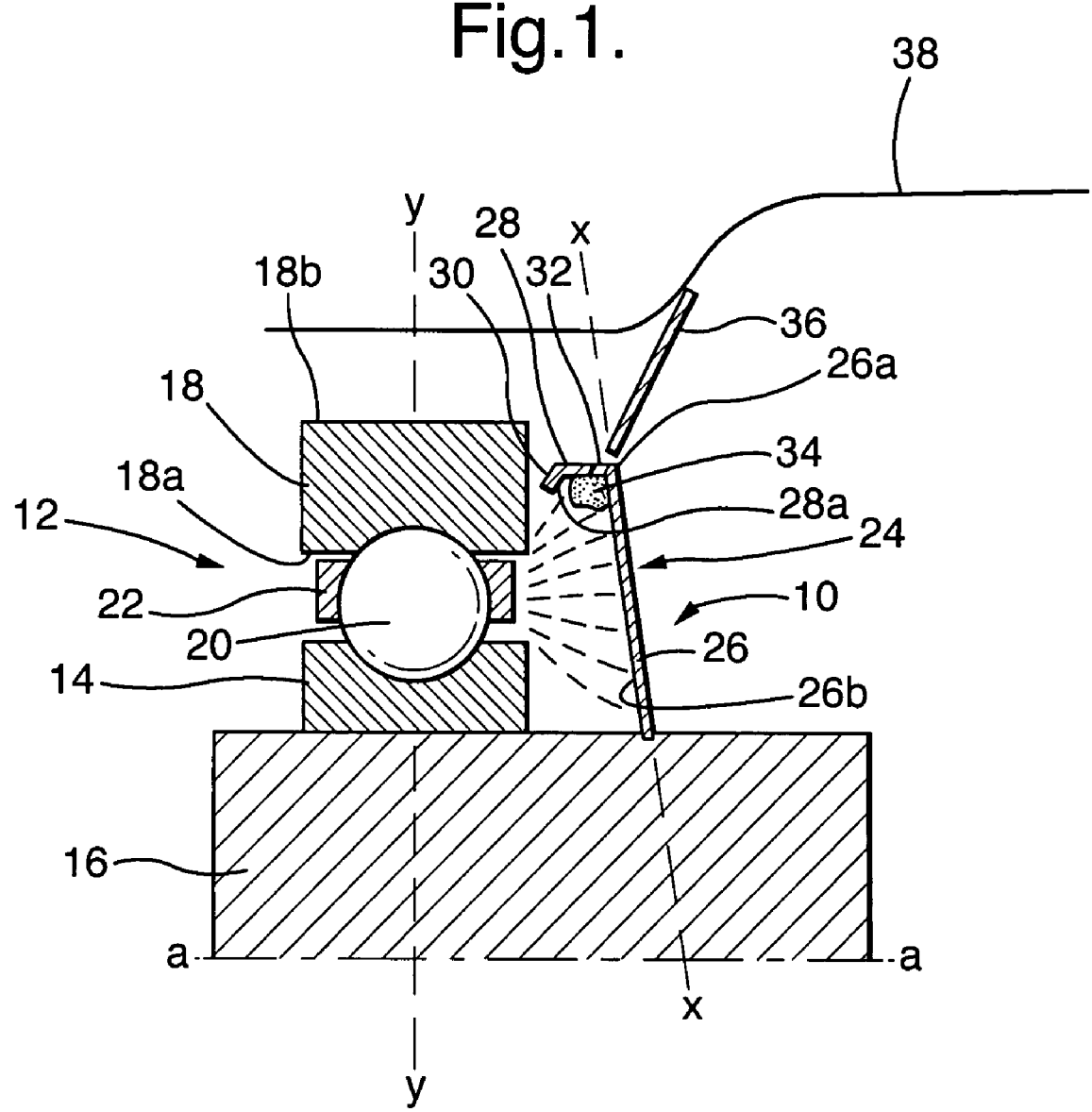
FIG. 1 is a diagrammatic cross-sectional view of part of a flow control arrangement according to a first embodiment of the present invention.

Referring to the drawings, there is shown generally a bearing 12 including an inner ring 14 mounted for rotation on a shaft 16, an outer ring 18, a plurality of rolling elements 20 located between the inner and outer rings 14, 18 and a bearing cage 22. The bearing 12 illustrated in the drawings is a ball bearing in which the rolling elements 20 are in the form of balls. It should however be understood that the bearing 12 could be another type of bearing, such as a roller bearing in which the rolling elements 20 are in the form of rollers.

As will be appreciated, only part of the bearing 12 and the shaft 16 are illustrated in FIGS. 1 and 2. The shaft 16 is rotatable about the axis aa, which defines the centreline of the shaft 16.

As the inner ring 14, and hence the rolling elements 20, are rotated by the shaft 16, lubricant, such as oil, is discharged from the bearing 12, as illustrated diagrammatically by the broken lines, from between the inner and outer rings 14, 18. In accordance with embodiments of the present invention, a flow control arrangement 10 is provided to control the flow of lubricant discharged from the bearing 12.

Referring to FIG. 1, a first embodiment of the flow control arrangement 10 includes a flow control member 24 located on the shaft 16 substantially adjacent to the bearing 12 at a position axially spaced therefrom. The flow control member 24 includes a generally annular portion 26 and is mounted on the shaft 16 so that it is rotated by the shaft 16 at the same rotational speed as shaft 16 and the bearing 12, and particularly the inner ring 14 of the latter. The annular portion 26 defines an axis xx and is arranged so that when mounted on the shaft 16, the axis xx is inclined relative to a radial axis yy of the bearing 12.

The flow control member 24 includes a circumferentially extending lip portion 28 which extends from a radially outer edge 26a of the annular portion 26 towards the adjacent bearing 12, and the lip portion 28 includes an inwardly directed portion 30 at its free end, closest to the bearing 12.

The flow control member 24 includes a plurality of orifices 32 and in the embodiment of FIG. 1, these orifices 32 are spaced circumferentially around the lip portion 28 to define a circumferential row of orifices 32. The circumferential row of orifices 32 is located at an inner end of the lip portion 28 where it meets the annular portion 26 of the flow control member 24.

In use, oil that is discharged from the bearing 12, as it is rotated by the shaft 14, impacts both an inner surface 26b of the annular portion 26 and an inner surface 28a of the lip portion 28 at various locations. The radial dimensions of the annular portion 26 are selected so that the outer edge 26a extends beyond the inner circumferential region 18a of the outer ring 18, towards the outer circumferential region 18b thereof. This ensures that the majority of the oil discharged from the bearing 12 is directed onto the flow control member 24, and particularly onto the inner surface 26b of the annular portion 26.

Due to the fact that the flow control member 24 is rotated by the shaft 16, oil impacting the inner surface 26b of the annular portion 26 forms a film that is moved, under the action of centrifugal force, radially outwardly towards the outer edge 26a of the annular portion 26. The oil accumulates to form a circumferentially extending pool 34 of oil, as is indicated diagrammatically, and the formation of the pool 34 is facilitated by the presence of the inwardly directed portion 30 of the lip portion 28.

Provided that the rotational speed of the shaft 16 and hence the rotational speed of the flow control member 24 is sufficient, the centrifugal force acting on the pool 34 of oil causes the oil to be ejected through the circumferential row of orifices 32 to form a plurality of circumferentially spaced jets 36 of oil. Depending on the configuration and arrangement of the orifices 32, and possibly on the flow conditions, the jets 36 of oil may combine to form a circumferentially extending film of oil which may, for example, be generally cone shaped.

Any number of orifices 32 can be provided in the flow control member 24, and the orifices 32 can be provided in a predetermined orientation and/or with a predetermined shape to control the direction and/or shape of the jets 36 and can have a predetermined size to provide control over the flow conditions and/or flow rate of oil ejected through the orifices 32 to form the jets 36. Embodiments of the present invention therefore offer advantages over the prior art in that they permit the flow of oil discharged from the bearing 12 to be very carefully controlled.

In particular, when the bearing 12 is located in a bearing chamber of a gas turbine engine, it becomes possible using the flow control arrangement 10 to utilise the oil ejected from the flow control arrangement 10 to provide enhanced cooling to the walls 38 of the bearing chamber. If minimising oil splashing were found to maximise the cooling effectiveness of the ejected oil then, as illustrated in FIG. 1, the orifices 32 could be configured so that the circumferential row of jets 36 eject oil to impact the walls 38 at a tangent, thereby minimising splashing. If an alternative oil ejection direction were found to be better for cooling, the orifices 32 could be configured so that the jets 36 are directed appropriately.

If the rotational speed of the shaft 16 is too low, which may arise in some circumstances, it is possible that there may be insufficient force acting on the circumferential pool 34 of oil to eject it from the flow control member 24 through the orifices 32. In this case, the size of the pool 34 will increase, as oil accumulates, until eventually the oil flows over the inwardly directed portion 30 of the lip portion 28. Embodiments of the invention thus offer a fail-safe design as there always remains a route by which oil discharged from the bearing 12 onto the flow control member 24 can be ejected from the flow control member 24 if it cannot be ejected by the preferred route, through the circumferential row of orifices 32.

A second embodiment of flow control arrangement 110 is shown in FIGS. 2 and 3. The flow control arrangement 110 is similar to the flow control arrangement 10 of FIG. 1, and corresponding components are designated using the same reference numerals, prefixed with the number '1'.

In the flow control arrangement 110, the flow control member 124 includes a plurality of orifices 132, and these are provided in both the annular portion 126 and in the lip portion 128.

The annular portion 126 includes a plurality of circumferential rows 140a, 140b, 140c of orifices 132, and these circumferential rows 140a-c are spaced radially across the annular portion 126 in proximity to the outer edge 126a. The lip portion 128 also includes a plurality of circumferentially extending rows 142a, 142b, 142c of orifices 132, and these circumferentially extending rows 142a-c are spaced along the length of the lip portion 128.

The provision of multiple rows of orifices 132 in both the annular portion 126 and the lip portion 128 offers advantages as a greater amount of oil can be ejected from the flow control member 124. For clarity purposes, the individual jets that are formed by oil ejected through each of the orifices 132 have not been illustrated in FIG. 2.

As the rotational speed of the shaft 116 and hence of the flow control member 124 decreases, the size of the pool 134 of accumulated oil will also increase, as explained above. As this happens, the additional circumferentially extending rows of orifices 132 in both the annular portion 126 and the lip portion 128 will permit the ejection of accumulated oil from the flow control member 124, thereby reducing the likelihood of oil flowing over the inner, free end, of the lip portion 128.

It will also be noted that the lip portion 128 of the flow control member 124 has been inclined in a slightly radially inwards direction. This inclination facilitates the accumulation of oil to form the pool 134 and as a result it is not necessary to provide the lip portion 128 with an inwardly directed portion as in the flow control arrangement 10 of FIG. 1.

There is thus provided a flow control arrangement 10, 110 which provides improved control over the flow of oil discharged from a bearing 12. In addition to the advantages mentioned above, the flow control arrangement 10, 110 may also reduce windage losses in the bearing chamber.

Although embodiments of the invention have been described in the preceding paragraphs with reference to various examples, it should be appreciated that various modifications to the examples given may be made without departing from the scope of the present invention, as claimed.

For example; the axis xx of the annular member 26, 126 may be generally parallel to the radial axis yy of the bearing 12 or may be inclined relative to the radial axis yy of the bearing 12 at any suitable angle. Only one of the annular portion 126 or the lip portion 128 may include a plurality of circumferential rows of orifices 132.

Any number of orifices 32, 132 may be provided and these may have any suitable shape and/or orientation and/or configuration.

The lip portion 128 of the flow control member 124 could be provided with an inwardly directed portion 130.

The flow control member 24, 124 may be mounted on a component of the bearing 12, such as the inner ring 14 or the bearing cage 22, so that it is rotated by the bearing component.

The invention claimed is:

1. A flow control arrangement for controlling the flow of lubricant discharged from a bearing, the flow control arrangement comprising:

a flow control member disposed adjacent to the bearing,
the flow control member defining a generally radially outer edge and being rotatable to direct lubricant discharged onto the flow control member radially outwardly towards the outer edge for ejection therefrom, wherein the flow control member includes a generally annular portion and a lip portion extending from an outer edge of the annular portion in a direction towards the bearing to permit ejection of the lubricant.

2. A flow control arrangement according to claim 1, wherein the flow control member is locatable in use at a position axially spaced from the bearing.

3. A flow control arrangement according to claim 1, wherein the flow control member includes an orifice to permit the ejection of lubricant from the radially outer edge.

4. A flow control arrangement according to claim 3, wherein the orifice is arranged to permit the ejection of lubricant from the radially outer edge in a predetermined direction.

5. A flow control arrangement according to claim 3, wherein the flow control member includes a plurality of said orifices.

6. A flow control arrangement according to claim 1, wherein the annular portion defines a radial axis, the radial axis being substantially parallel in use to a radial axis of the bearing.

7. A flow control arrangement according to claim 1, wherein the annular portion defines a radial axis, the radial axis being inclined relative to a radial axis of the bearing such that the annular portion is inclined in use towards the bearing.

8. A flow control arrangement according to claim 1, wherein the annular portion includes a plurality of said orifices spaced circumferentially around the outer edge thereof to define a circumferential row of orifices.

9. A flow control arrangement according to claim 8, wherein the annular portion includes a plurality of said circumferential rows of orifices.

10. A flow control arrangement according to claim 9, wherein said circumferential rows of orifices are spaced radially across the annular portion in proximity to the outer edge thereof.

11. A flow control arrangement according to claim 1, wherein the lip portion includes a plurality of said orifices spaced circumferentially therearound to define a circumferential row of orifices.

12. A flow control arrangement according to claim 11, wherein the lip portion includes a plurality of said circumferential rows of orifices.

13. A flow control arrangement according to claim 12, wherein said circumferential rows of orifices are spaced along the lip portion.

14. A flow control arrangement according to claim 1, wherein the flow control member is arranged to be mounted in use on a shaft on which the bearing is mounted for rotation by the shaft.

15. A flow control arrangement according to claim 1, wherein the flow control member is arranged to be mounted in use on an inner ring of the bearing for rotation by the inner ring.

16. A bearing assembly including a bearing mountable in use on a shaft for rotation by the shaft and a flow control arrangement according to claim 1 for controlling the flow of lubricant discharged from the bearing.

17. A gas turbine engine including a flow control arrangement according to claim 1.

* * * * *